United States Patent
Hergenhan

(10) Patent No.: US 6,947,227 B2
(45) Date of Patent: Sep. 20, 2005

(54) POSITIONING DEVICE

(75) Inventor: Guido Hergenhan, Jena (DE)

(73) Assignee: MILASYS GbR, Weil im Schoenbuch (DE)

( * ) Notice: Subject to any disclaimer, the term of this patent is extended or adjusted under 35 U.S.C. 154(b) by 0 days.

(21) Appl. No.: 10/714,555

(22) Filed: Nov. 14, 2003

(65) Prior Publication Data
US 2004/0145821 A1 Jul. 29, 2004

Related U.S. Application Data

(63) Continuation of application No. PCT/EP02/05203, filed on May 11, 2002.

(30) Foreign Application Priority Data

May 14, 2001 (DE) .......................................... 101 24 563

(51) Int. Cl.⁷ ................................................ G02B 7/02
(52) U.S. Cl. ...................... 359/813; 359/811; 359/819; 359/822; 362/259
(58) Field of Search ................................. 359/813, 811, 359/819, 822, 823; 362/259, 455; 385/33, 93

(56) References Cited

U.S. PATENT DOCUMENTS 5,402,165 A * 3/1995 Linville et al. ................ 348/85
5,997,153 A * 12/1999 Naoe et al. .................. 362/259

* cited by examiner

Primary Examiner—Timothy Thompson
(74) Attorney, Agent, or Firm—Lipsitz & McAllister, LLC

(57) ABSTRACT

In order to provide a positioning device for the exact positioning of a first optical component relative to a second optical component, with which optical components may be positioned relative to one another in an exact and permanent manner and which allows, in addition, relatively simple adjustment, it is suggested that the positioning device comprise a first fixing element and at least one second fixing element which are guided relative to one another by a guide means such that they can be moved towards one another essentially only in a clamping direction and that the positioning device have at least one support element arranged between them, the position of which relative to the fixing elements can be adjusted in at least one direction transversely to the clamping direction and can be fixed between the fixing elements by way of clamping and that the optical components be held on different ones of the elements adjustable relative to one another.

20 Claims, 4 Drawing Sheets

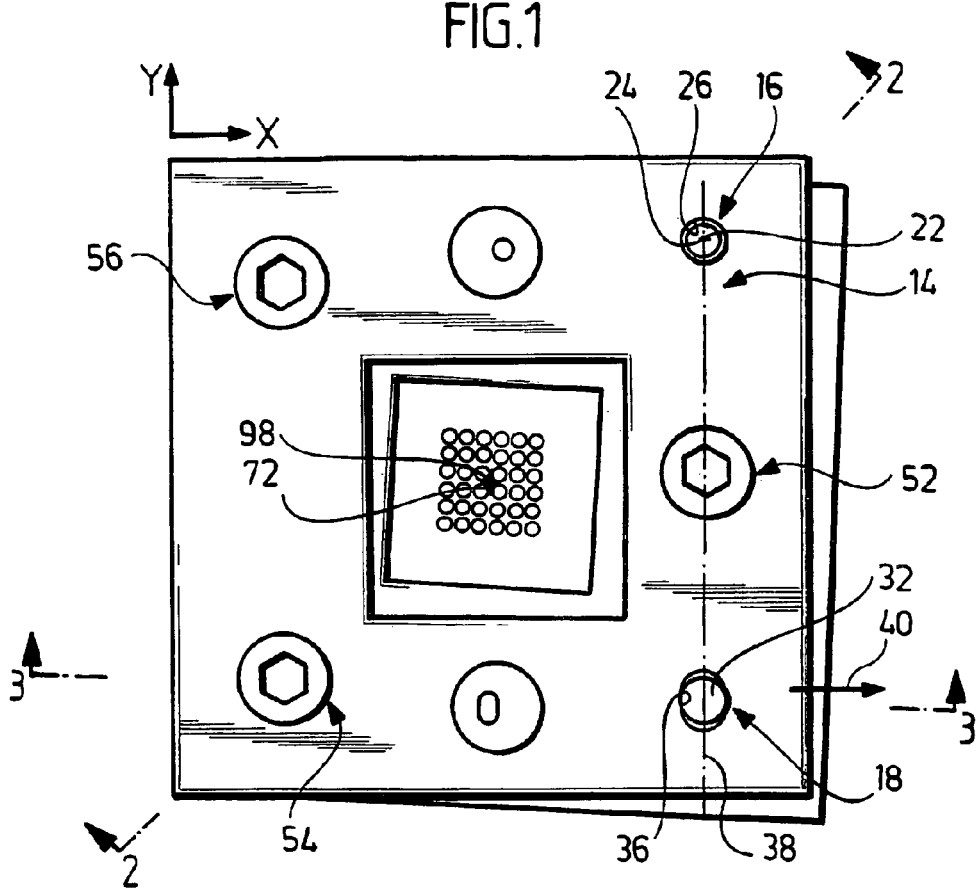
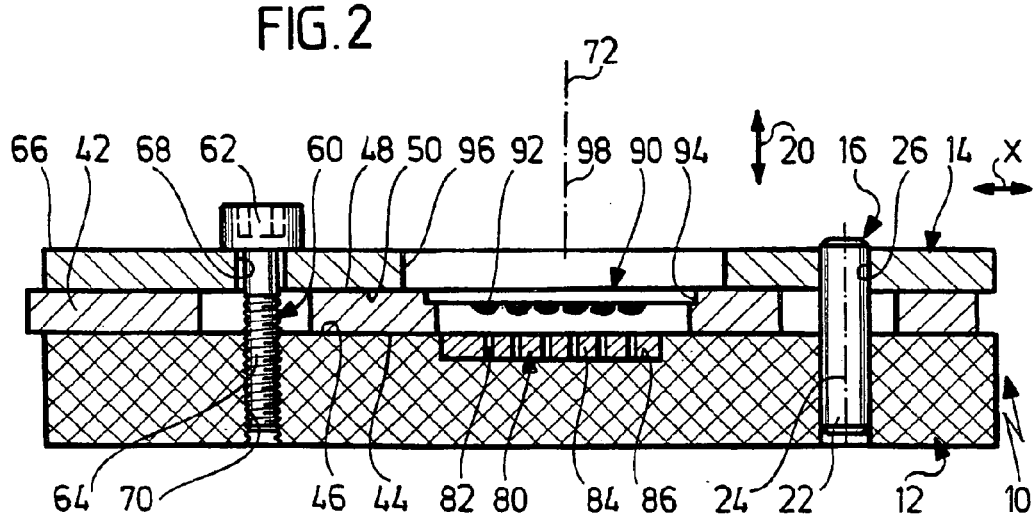

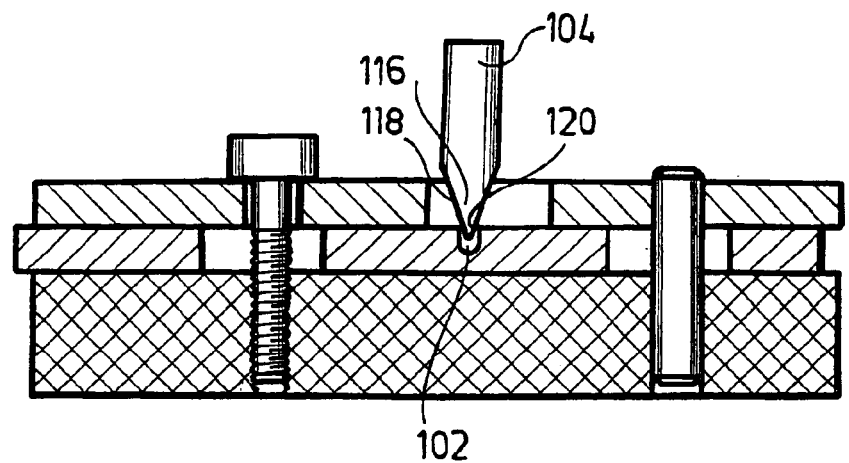
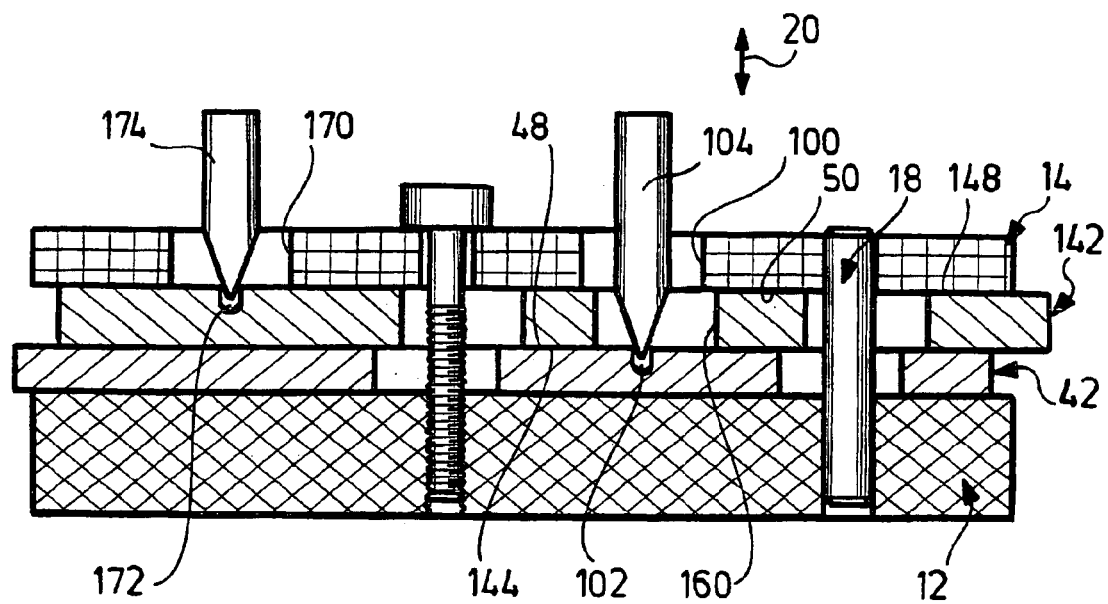

POSITIONING DEVICE

This application is a continuation of international application No. PCT/EP02/05203 filed on May 11, 2002.

The present disclosure relates to the subject matter disclosed in International application No. PCT/EP02/05203 of May 11, 2002, which is incorporated herein by reference in its entirety and for all purposes.

BACKGROUND OF THE INVENTION

The invention relates to a positioning device for the exact positioning of a first optical component relative to a second optical component.

During the positioning of two optical components relative to one another, the precision achieved, in particular, in a direction transverse to an optical axis is to be as great as possible. This applies, in particular, when one dimensional or two dimensional arrangements of optical components, so-called arrays, are to be arranged relative to one another.

The object underlying the invention is, therefore, to provide a positioning device, with which optical components may be positioned relative to one another in an exact and permanent manner and which allows, in addition, relatively simple adjustment.

SUMMARY OF THE INVENTION

This object is accomplished in accordance with the invention, in a positioning device for the exact positioning of a first optical component relative to a second optical component in that the positioning device comprises a first fixing element and at least one second fixing element which are guided relative to one another by a guide means such that they can be moved towards one another essentially only in a clamping direction and that the positioning device has at least one support element arranged between them, the position of which relative to the fixing elements can be adjusted in at least one direction transversely to the clamping direction and can be fixed between the fixing elements as a result of clamping and that the optical components are held on different ones of the elements adjustable relative to one another.

The inventive positioning device therefore provides the possibility, as a result of the arrangement of the at least one support element between the two fixing elements, of, on the one hand, adjusting the support element relative to the fixing elements in a position of the fixing elements not fixing the support element in a force-locking manner and of then fixing the support element between the fixing elements as a result of clamping, wherein due to the fact that the two fixing elements abutting on the support element are blocked by the guide means from any movement transversely to the clamping direction, no maladjustment of the support element takes place during the clamping thereof and so the clamping of the support element between the fixing elements does not impair the exactness of any adjustment once achieved and, consequently, precision adjustments transversely to the clamping direction can be achieved in the micrometer range, preferably even in the submicrometer range.

In order to bring about an exact guidance of the two fixing elements relative to one another, it is particularly favorable when not only one guide means is provided but rather when the fixing elements are guided relative to one another by several guide means.

It is expedient, in particular, in the case where several guide means are provided when one of the guide means blocks at least any translational movement transversely to the clamping direction.

Furthermore, it is advantageous in the case where several guide means are provided when one of the guide means blocks any rotational movement about an axis of rotation parallel to the clamping direction.

It is particularly favorable when the several guide means block not only translational movements transversely to the clamping direction but also rotational movements about an axis parallel to the clamping direction.

With respect to the design of the guide means, no further details have been given in conjunction with the preceding explanations concerning the individual embodiments.

For example, all types of guide means, such as, for example, dovetail guide means or similar guide means, are conceivable as guide means.

For reasons of constructional simplicity, it has proven to be particularly favorable when a guide means is formed by an alignment pin and an alignment pin receiving means, wherein the alignment pin is arranged on one fixing element and the alignment pin receiving means on the other fixing element.

Particularly in the case of several guide means, it has proven to be advantageous when one guide means is designed as an alignment pin and an alignment pin receiving means and the other guide means has a degree of freedom in a radial direction in relation to the one guide means and forms an exact guide means only in a transverse direction in relation to the radial direction. As a result, the one guide means blocks any translational movements in a plane extending transversely to the clamping direction and the other guide means blocks any rotational movements about the one guide means, wherein any geometric overdetermination is prevented by the two interacting guide means.

With respect to the fixing of the support element between the fixing elements, no further details have so far been given. It would be conceivable, for example, to provide a form-locking fixing of the support element, for example, by means of adjusting elements acting on it, in the simplest case in the form of setscrews.

A particularly favorable solution which is advantageous, in particular, with respect to the maladjustment during the fixing of the support element provides for the support element to be fixable in a force-locking manner between the fixing elements.

Such a force-locking fixing of the support element may be brought about constructionally in a particularly favorable manner in that the fixing elements can be acted upon in a clamping direction by means of at least one clamping device, wherein the support element is adjusted when the clamping device is released.

Clamping devices of this type may be realized in the most varied of ways.

For example, clamping devices of this type can be realized by means of spring elastic elements.

A solution, with which the clamping device comprises a tightening screw, is particularly inexpensive and advantageous.

Preferably, the clamping device is always arranged to the side next to the optical components.

In principle, one clamping device for clamping the support element between the fixing elements would be sufficient. It is, however, particularly favorable when several clamping devices are provided, particularly when a roughly uniform clamping of the support element by means of the clamping devices arranged to the side next to the optical components is intended to be brought about.

Such provision of several clamping devices can lead to problems with respect to thermal expansions.

For this reason, it is advantageous when the several clamping devices are arranged in a type of multiple symmetry in relation to an axis of symmetry so that the fixing elements clamped to one another also remain symmetrical in relation to the axis of symmetry in the case of any thermal expansion.

In this respect, the axis of symmetry is preferably arranged such that it extends approximately parallel to the clamping direction.

A behavior symmetrical to an axis of symmetry is particularly favorable when the axis of symmetry extends through the optical components which can be positioned relative to one another so that the behavior symmetrical to the axis of symmetry has an extremely small effect and, if so, then symmetrically onto the optical components.

It is particularly expedient when the axis of symmetry coincides with an optical axis of symmetry of the optical components.

The negative influence of thermal expansions on the precise adjustment is particularly small when the axis of symmetry extends parallel to an optical axis of the optical components.

With respect to as great a positioning and adjustment precision as possible, it has proven to be particularly advantageous when the fixing elements and the at least one support element abut on one another with respective, polished surfaces since, in this case, a high precision with respect to the adjustment of the support element relative to the fixing elements is possible on account of the reduced surface roughness.

In the case of two support elements, it has proven to be advantageous for the same reasons when the several support elements likewise abut on one another and on the fixing elements with polished surfaces.

In order to be able to adjust the support elements advantageously, it has proven to be particularly favorable when each support element is provided with a contact element, via which a connection to an adjusting device can be provided, wherein the adjusting device and the fixing elements are preferably arranged so as to be stationary in relation to one another so that an adjustment is possible via the adjusting device due to displacement of the support element relative to the fixing elements.

The contact element itself can be designed in the most varied of ways. For example, it would be conceivable to design the contact element itself as an arm which projects beyond the fixing elements and on which the adjusting device then engages.

Another advantageous solution provides for the contact element to be a receiving means for an adjusting finger of the adjusting device.

In order to provide advantageous access to the contact element, it is preferably provided for this to be accessible via an opening in one of the fixing elements so that the support element need not be acted upon from the side between the fixing elements but rather the support element can be acted upon for the purpose of adjustment through one of the fixing elements.

The optical components may, in principle, be arranged in the most varied of ways.

For example, an adjustment of two optical components relative to one another is possible due to the fact that each of the components is arranged on a support element and the two support elements are adjusted relative to one another and fixed by the fixing elements.

Another advantageous possibility provides for one of the optical components to be arranged on one of the fixing elements and the other on a support element.

Even more advantageously, in the case of several optical components which are to be adjusted relative to one another all the optical components may be arranged on the support elements or preferably one of the optical components on one of the fixing elements so that the number of support elements can be reduced.

Additional features and advantages of the invention are the subject matter of the following description as well as the drawings illustrating several embodiments.

BRIEF DESCRIPTION OF THE DRAWINGS

FIG. 1 shows a plan view of a first embodiment of an inventive positioning device;

FIG. 2 shows a section along line 2—2 in FIG. 1;

FIG. 5 shows a section similar to FIG. 3 with a finger of an adjusting device acting on a support element;

FIG. 6 shows a section similar to FIG. 3 through a second embodiment of an inventive positioning device and FIG. 7 shows a section similar to FIG. 3 through a third embodiment of a positioning device.

DETAILED DESCRIPTION OF THE INVENTION

Figure 3:
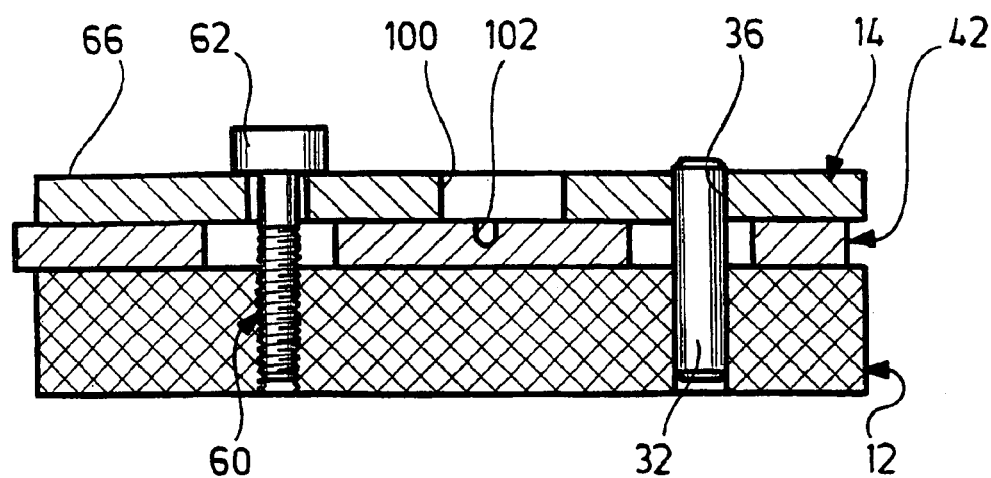
FIG. 3 shows a section along line 3—3 in FIG. 1.

A first embodiment of an inventive positioning device, illustrated in FIGS. 1 to 3, comprises a fixing device which is designated as a whole as 10 and has a first fixing element 12 and a second fixing element 14 which are, for example, of a plate-like design and are fixed relative to one another by a first guide means 16 and a second guide means 18 in such a manner that a relative movement is possible only in a clamping direction.

The first guide means 16 preferably consists of an alignment pin 22 which is, for example, seated securely in the first fixing element 12 and extends with its longitudinal axis 24 parallel to the clamping direction in the direction of the second fixing element 14 and engages in an alignment recess 26 which is arranged in the second fixing element 14 and, for example, passes through this so that the alignment pin 22 likewise passes into the alignment recess 26 from one side and protrudes on the side located opposite.

The second fixing means 18 likewise comprises an alignment pin 32 which is arranged so as to be securely seated in the first fixing element 12 and extends in the direction of the second fixing element 14 and likewise passes through an alignment recess 36 in the second fixing element 14.

In contrast to the alignment recess 26, which, with respect to the longitudinal axis 24 of the alignment pin 22, forms a guide means on all sides of the second fixing element 14 relative to the first fixing element 12, the alignment recess 36 is designed such that it does not represent any guide means for the second fixing element 14 relative to the alignment pin 32 in a radial direction 38 in relation to the longitudinal axis 24 of the alignment pin 22 but rather merely guides the second fixing element 14 relative to the alignment pin 32 in a transverse direction 40 extending at right angles to the radial direction 38.

As a result of any guidance of the second fixing element 14 in the radial direction 38 being avoided, an overdetermination of the guidance of the second fixing element 14 relative to the first fixing element 12 by way of the first guide means 16 is avoided and so the second guide means 18 merely represents a guidance of the second fixing element 14 against any rotation about the alignment pin 22 of the first guide means 16.

As a result, the second fixing element 14 is, altogether, secured relative to the first fixing element 12 by way of the first guide means 16 and the second guide means 18 against any movement in all the directions X and Y extending at right angles to the clamping direction 20 and, in addition, against any rotation in the plane defined by the directions X and Y about an axis extending at right angles to this plane and parallel to the clamping direction 20 and is movable exclusively in the clamping direction 20, namely guided in a precise manner by at least one alignment guide means.

A support element designated as a whole as 42 is arranged between the fixing elements 12 and 14 of the fixing device 10 and this support element abuts, on the one hand, on a contact surface 46 of the first fixing element 12 with a first guide surface 44 and, on the other hand, abuts on a contact surface 50 of the second fixing element 14 with a second guide surface 48, wherein the guide surfaces 44 and 48 and the contact surfaces 46 and 50, respectively, extend parallel to one another and, in particular, also parallel to the X and Y directions.

As a result, the support element 42 is guided between the fixing elements 12 and 14 in a direction parallel to the guide surfaces 44, 48 and the contact surfaces 46, 50, preferably in X and Y directions, and is kept in alignment by the two guide surfaces 44 and 48 which abut on corresponding contact surfaces 46 and 50 of the fixing elements 12 and 14.

In this respect, not only the guide surfaces 44 and 48 but also the contact surface 46 and 50 are preferably designed as polished surfaces which allow a precise displacement of the support element 42 relative to the fixing elements 12 and 14, guided in X and Y directions, on account of their slight surface roughness.

This displaceability or adjustability of the support element 42 relative to the fixing elements 12 and 14, preferably in X and Y directions, is possible only for as long as the fixing elements 12 and 14 are not acted upon by a force in a direction towards one another such that a force-locking fixing of the support element 42 relative to the fixing elements 12 and 14 results on account of the guide surfaces 44 and 48 pressed against the contact surfaces 46 and 50.

In order, on the one hand, to be able to displace and, therefore, adjust the support element 42 relative to the fixing elements 12 and 14 and, on the other hand, to be able to secure the support element 42 relative to the fixing elements 12 and 14, three clamping devices 52, 54 and 56 are, for example, provided, each of which comprises a tightening screw 60 with a screw head 62 and a threaded section 64, wherein the screw head 62 rests, for example, on an upper side 66 of the second fixing element 14 facing away from the contact surface 50, the threaded section 64 then passes through an opening 68 in the second fixing element 14 and is, finally, screwed into a threaded bore 70 in the first fixing element 12. The fixing elements 12 and 14 may be acted upon in the clamping direction 20 towards one another with such a tightening screw 60 which preferably extends parallel to the clamping direction 20 and, therefore, the support element 42 may be clamped between the fixing elements 12 and 14 and, as a result, fixed in a force-locking manner relative to them.

In order to bring about as uniform an action as possible on the fixing elements 12 and 14 and as uniform a clamping as possible of the support element 42 between them, the clamping devices 52, 54 and 56 are preferably arranged in the manner of a multiple, in this case, three-fold symmetry in relation to an axis of symmetry 72 so that the entire positioning device 10 is essentially symmetrical to the axis of symmetry 72 even during any heating up and, where possible, expands symmetrically to it or develops stresses symmetrical to it.

The first embodiment of the inventive positioning device preferably serves the purpose of positioning an array, designated as a whole as 80, of light sources of semiconductor emitters 82, for example, a linear or two-dimensional arrangement of such semiconductor emitters 82 which are seated on a common substrate 84 which is, for its part, held, for example, in a receiving means 86 in the first fixing element 12, relative to an optical array 90 which has, for example, a collimating optical imaging means 92 for each semiconductor emitter 82, wherein the optical imaging means 92 are arranged in a pattern within the optical array 90 which corresponds exactly to the pattern, in which the semiconductor emitters 82 are arranged in the array 80 of light sources.

In this respect, the optical array 90 is positioned, for example, in a receiving means 94 of the support element 42. It is, however, also possible to design the support element 42 such that the optical array 90 with the individual optical imaging means 92 is located directly in it.

In this respect, the clamping devices 52, 54, 56 are arranged such that they are arranged to the side of and outside the optical components 80, 90.

In addition, the second fixing element 14 has a recess 96, via which light can exit from the components 80, 90.

The array 80 of light sources and also the optical array 90 are preferably arranged such that they are positioned symmetrically to the axis of symmetry 72 so that heat expansions or stresses in the positioning device likewise act symmetrically on the array 80 of light sources or the optical array 90.

It is particularly favorable when the array 80 of light sources and the optical array are likewise designed so as to be symmetrical to the axis of symmetry 72 and have an optical axis 98 extending at least parallel to it.

One of the fixing elements, preferably the fixing element 14, is provided, for example, with an opening 100 for the exact positioning of the support element 42 relative to the fixing elements 12 and 14 and the support element 42 has a contact element 102 which is located in the area of the opening 100 and via which it is possible to act on the support element 42 in order to displace this relative to the fixing elements 12 and 14.

Figure 4:
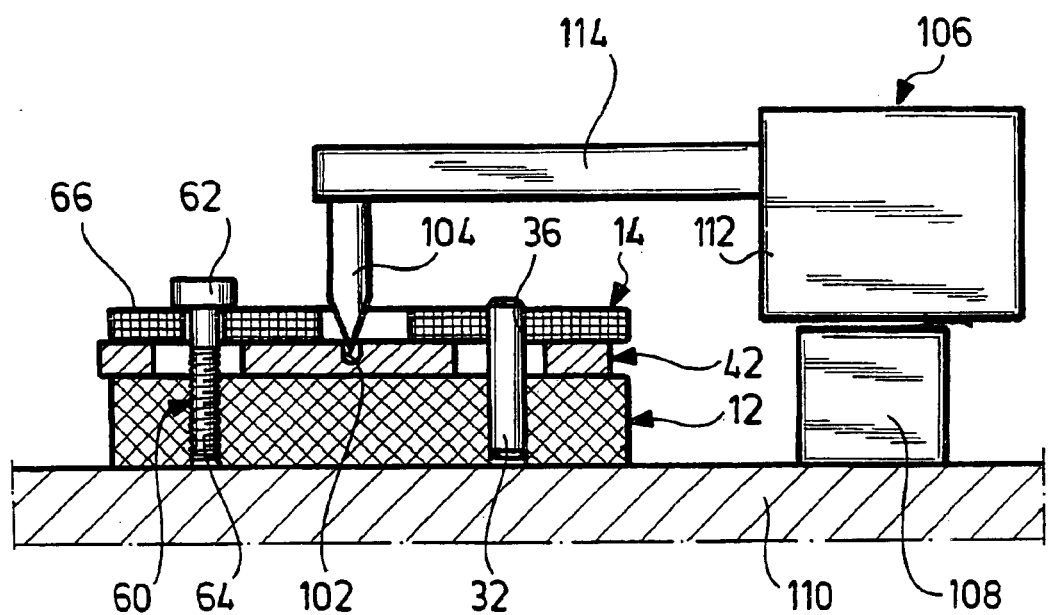
FIG. 4 shows a section similar to FIG. 3 together with an adjusting device provided for the adjustment of the support element.

The contact element 102 is designed, for example, as a bore which is open towards the opening 100 and with which a finger 104 of an adjusting device, which is designated as a whole as 106 and illustrated in FIG. 4, can be brought into engagement.

The adjusting device 106 is seated, for example, with a foot 108 on a base 110, on which the fixing element 12 is also secured.

Furthermore, the adjusting device 106 comprises a head 112 which is movable relative to the foot 108 with precision movement elements and from which an arm 114 projects, which supports the finger 104, engages over the inventive positioning device and holds the finger 104 such that this interacts with the contact element 102.

In this respect, the finger 104 preferably has a tip 116 which is provided with a conical outer surface 118 and an interaction takes place between the tip 116 and an outer wall 120 of the bore forming the contact element 102 by way of this conical outer surface (FIG. 5).

If all the clamping devices 52, 54 and 56 are released, the support element 42 between the fixing elements 12 and 14 may be adjusted exactly relative to the fixing element 12 by means of the adjusting device 106 and, as a result, an exact adjustment of the optical array 90 relative to the array 80 of light sources of the semiconductor emitters 82 takes place at the same time, wherein the exact adjustment of the optical array 90 relative to the array 80 of light sources can be checked, for example, optically, possibly controlled by the optical emission from one or several of the semiconductor emitters 82.

The adjustment requires not only a precise positioning of the support element 42 in the X and Y directions but also, at the same time, an exact positioning with respect to the rotation in the X-Y plane, for example, a rotation about the axis of symmetry 72 so that the corresponding optical imaging means 92 is associated with each semiconductor emitter 82 in an exactly positioned manner.

In this respect, the positioning of the support plate 42 may be carried out particularly advantageously when—as already mentioned—the guide surfaces 44 and 48 as well as the corresponding contact surfaces 46 and 50, respectively, are polished surfaces so that the surface roughness is so slight that this does not hinder the accuracy of positioning and, therefore, an accuracy of positioning in the submicrometer range can, for example, be achieved.

Following the exact positioning of the support plate 42 relative to the fixing elements 12 and 14, the clamping devices 52, 54 and 56 are tightened, in this case by turning the tightening screws 60 tight, and, as a result, the support element 42 is fixed in a force-locking manner due to the contact pressure in the area of the guide surfaces 44 and 48 and the corresponding contact surfaces 46 and 50, respectively, abutting on them and so the support element 42 can be fixed permanently relative to the fixing elements 12 and 14.

During this tightening of the tightening screws 60 of the clamping devices 52, 54 and 56, a maladjustment of the support element 42, for example, relative to the fixing element 12 is avoided due to the fact that the tightening screws 60 do not act directly on the support element 42 with their screw heads 62 but rather on the fixing element 14 and, in addition, as a result of the exact guidance of the fixing element 14 against all movements in X and Y directions as well as rotations in the plane defined by these X and Y directions any impairment whatsoever which affects the precision of the positioning of the support element 42 relative to the fixing element 12 is avoided since the forces acting on the fixing element 14 due to the screw heads 62 in the sense of displacements in the X and Y directions and rotations in the plane defined by the X and Y directions are absorbed by the guide means 16 and 18 and are not, therefore, transferred to the support element 42.

As a result, the position of the support element 42 relative to the fixing element 12 once determined by the adjusting device 106 is also maintained during the tightening of the tightening screws 60 and once the support element 42 is secured the finger 104 can disengage from the contact element 102 since the inventive positioning device permanently maintains the position of the support element 42 relative to the fixing element 12.

In a second embodiment of an inventive positioning device, illustrated in FIG. 6, those parts which are identical to those of the first embodiment are given the same reference numerals and so with respect to the description thereof reference can be made in full to the comments concerning the first embodiment.

In contrast to the first embodiment, it is not just one support element 42 which is provided between the fixing elements 12 and 14 but rather two support elements, namely the support element 42 and a support element 142, are provided between the fixing elements 12 and 14 and these abut, for example, directly on one another so that the second guide surface 48 of the support element 42 abuts on a first guide surface 144 of the support element 142 and the second guide surface 148 of the support element 142 abuts on the contact surface 50 of the second fixing element 14.

In this respect, all the surfaces abutting on one another are polished in the same way as in the first embodiment.

In the second embodiment, as well, the first fixing element 12 and the second fixing element 14 are fixed relative to one another by way of two guide means 16 and 18 so that the fixing elements 12 and 14 of the second embodiment of the inventive positioning device can also be moved relative to one another only in the clamping direction 20.

In order to offer the possibility of positioning both support elements 42 and 142 at the same time exactly relative to one another and exactly relative to the fixing element 12, the support element 42 is provided with the contact element 102 in the same way as in the first embodiment but in addition to the opening 100 in the second fixing element 14 an opening 160 is provided in the support element 142, in addition, when this is located between the support element 42 and the fixing element 14 so that the finger 104 can engage through the openings 100 and 160 and can interact with the contact element 102.

In addition, the second fixing element 14 is provided with an additional opening 170 and the support element 142 with its own contact element 172, with which an additional finger 174 of an additional adjusting device can be brought into engagement, wherein the additional finger 174 can have access to the contact element 172 through the opening 170.

The support elements 42 and 142 are now adjusted by two adjusting devices for the fingers 104 and 174 which operate independently of one another so that each of the support elements 42 and 142 can be adjusted exactly relative to the fixing element 12 and the two support elements 42 and 142 can also be adjusted exactly relative to one another.

In the second embodiment of the inventive positioning device, it is conceivable to position two optical components relative to one another in the same way as in the first embodiment, wherein one of the components can be arranged, for example, on one of the supports 42 and 142 and the other one of the components on the other support 142, 42.

It is, however, also possible to position, altogether, three optical components relative to one another with the second embodiment of the inventive positioning device, wherein one of the components is arranged in one of the fixing elements 12 or 14 and the support elements 42 and 142 likewise support a respective optical component so that, as a result of their exact positioning, the altogether three optical components can be positioned exactly relative to one another.

As a result of the openings 100 and 170 in one of the fixing elements 12, 14 and the additional opening 160 it is possible to act on both support elements 42, 142 from the same side of the positioning device in order to adjust them.

As for the rest, reference is made in full to the comments concerning the first embodiment with respect to construction, operation and adjustment of the second embodiment of the inventive positioning device.

Figure 7:
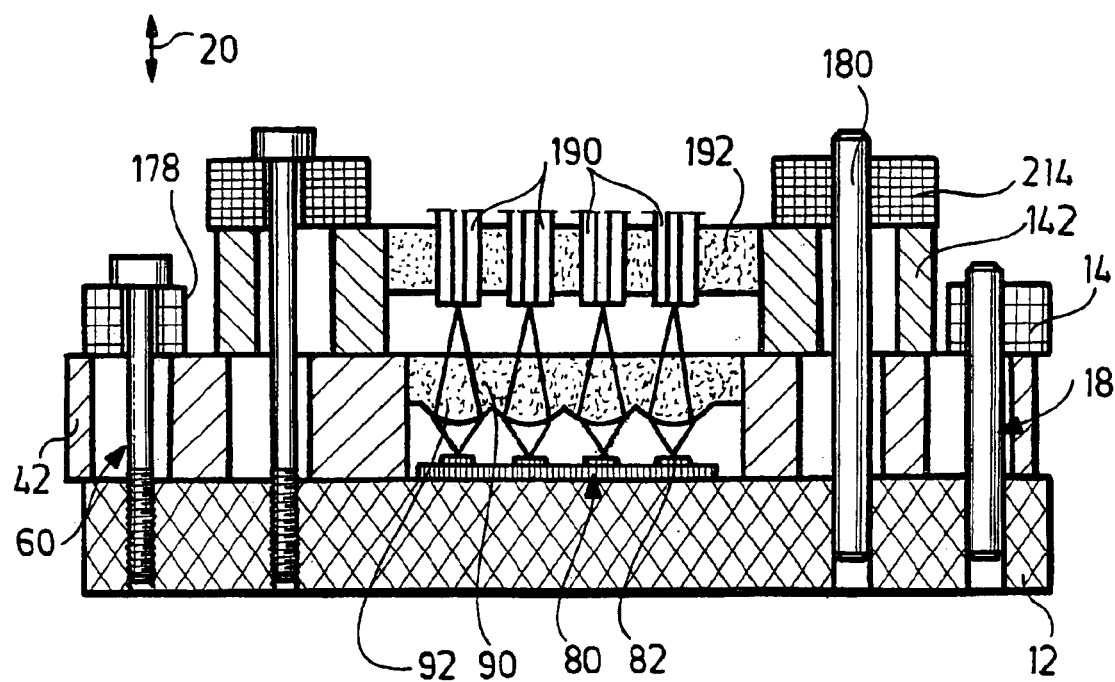

In a third embodiment of the inventive positioning device, illustrated in FIG. 7, those parts which are identical to those of the first and second embodiments are given the same reference numerals and so with respect to their description reference can likewise be made to the comments concerning the first embodiment and concerning the second embodiment.

In contrast to the preceding embodiments, in addition to the first fixing element 12 and the second fixing element 14 an additional second fixing element 214 is provided in the third embodiment of the inventive positioning device, illustrated in FIG. 7.

The fixing element 12 and the fixing element 14 are likewise guided by guide means 16, 18, in the same way as that described for the first embodiment, such that they can be moved relative to one another only in clamping direction 20, wherein the support element 42 can be clamped between them and fixed following adjustment in the same way as that described for the first embodiment.

In addition, the support element 142 is seated on the first support element 42, namely within an opening 178 in the fixing element 14 and this support element is also mounted on the support element 42, wherein the fixing element 14 surrounds the support element 142 but such that the support element 142 can still be moved within the opening 178 relative to the fixing element 14.

As a result, the fixing element 14 merely acts on an outer area of the support element 42 and is, therefore, only in a position to clamp the support element 42 between itself and the fixing element 12 in its outer area.

In addition, the additional support element 142 rests on the support element 42, namely within the fixing element 14, and, as a result, both support elements 42 and 142 are located between the fixing element 12 and the additional second fixing element 214 which is likewise guided exactly relative to the fixing element 12 by guide means, for example, the guide means 180 and is movable only in clamping direction 20.

As a result, it is possible, first of all, to adjust the support element 42 exactly relative to the fixing element 12 and then fix it permanently relative to this fixing element, namely by way of interaction of the fixing elements 12 and 14, and, subsequently, to adjust the support element 142 relative to the support element 42 and to the fixing element 12 and then position it permanently by way of interaction of the fixing elements 12 and 214.

For example, in this third embodiment of the inventive positioning device the fixing element 12 supports the array 80 of light sources with the semiconductor emitters 82, the support element 42 supports the optical array 90 with the optical imaging means 92 for each of the semiconductor emitters 82 and the support element 142 supports an array of light guides 190 which are seated in a light guide holder 192 and are likewise arranged in the same pattern as the optical imaging means 92 so that, for example, as a result the radiation of the semiconductor emitters 82 can be coupled directly into the individual light guides 190 via the individual optical imaging means 92, wherein, in this case, the optical imaging means 92 are not collimating optical means but rather optical means which focus radiation exiting from the semiconductor emitters 82 into the light guides 190.

What is claimed is:

1. Positioning device for the exact positioning of a first optical component relative to a second optical component, the positioning device comprising:
   a first fixing element and at least one second fixing element guided relative to one another by a guide means such that they are movable towards one another essentially only in a clamping direction; and
   at least one support element arranged between the fixing elements, each of said at least one support element being provided with a contact element adapted to provide a connection to an adjusting device, the position of said at least one support element relative to the fixing elements being adjustable in at least one direction transversely to the clamping direction by said adjusting device and being adapted to be fixed between the fixing elements as a result of clamping, the optical components being held on different ones of the elements adjustable relative to one another.

2. Positioning device as defined in claim 1, wherein the fixing elements are guided relative to one another by several guide means.

3. Positioning device as defined in claim 2, wherein one of the guide means blocks at least any translational movement transversely to the clamping direction.

4. Positioning device as defined in claim 2, wherein one of the guide means blocks any rotational movement about an axis of rotation parallel to the clamping direction.

5. Positioning device as defined in claim 1, wherein the guide means is formed by an alignment pin and an alignment pin receiving means, wherein the alignment pin is arranged on one fixing element and the alignment pin receiving means on the other fixing element.

6. Positioning device as defined in claim 5, wherein:
   the fixing elements are guided relative to one another by several guide means;
   one of said several guide means is designed as an alignment pin and alignment pin receiving means and the other guide means has a degree of freedom in a radial direction in relation to the one guide means and forms an exact guide means only in a transverse direction in relation to the radial direction.

7. Positioning device as defined in claim 1, wherein the support element is adapted to be fixed in a force-locking manner between the fixing elements.

8. Positioning device for the exact positioning of a first optical component relative to a second optical component, the positioning device comprising:
   a first fixing element and at least one second fixing element guided relative to one another by a guide means such that they are movable towards one another essentially only in a clamning direction, the fixing elements being adapted to be acted upon in a clamping direction by several clamping devices, the several clamping devices are arranged in a type of multiple symmetry in relation to an axis of symmetry; and
   at least one support element arranged between the fixing elements, the position of said at least one support element relative to the fixing elements being adjustable in at least one direction transversely to the clamping direction and being adapted to be fixed between the fixing elements as a result of clamping the optical components being held on different ones of the elements adjustable relative to one another.

9. Positioning device as defined in claim 8, wherein the clamping device comprises a tightening screw.

10. Positioning device as defined in claim 1, wherein the fixing elements are adapted to be acted upon in the clamping direction by several clamping devices.

11. Positioning device as defined in claim 10, wherein the several clamping devices are arranged in a type of multiple symmetry in relation to an axis of symmetry.

12. Positioning device as defined in claim 8, wherein the axis of symmetry extends approximately parallel to the clamping direction.

13. Positioning device as defined in claim 8, wherein the axis of symmetry extends through the optical components positionable relative to one another.

14. Positioning device for the exact positioning of a first optical component relative to a second optical component, the positioning device comprising;
- a first fixing element and at least one second fixing element guided relative to one another by a guide means such that they are movable towards one another essentially only in a clamping direction; and
- at least one support element arranged between the fixing elements, the fixing elements and the at least one support element abutting on one another with respective polished surfaces, the position of said at least one support element relative to the fixing elements being adjustable in at least one direction transversely to the clamping direction and being adapted to be fixed between the fixing elements as a result of clamping, the optical components being held on different ones of the elements adjustable relative to one another.

15. Positioning device as defined in claim 1, wherein at least two support elements are arranged between the fixing elements.

16. Positioning device for the exact positioning of a first optical component relative to a second optical component, the positioning device comprising;
- a first fixing element and at least one second fixing element guided relative to one another by a guide means such that they are movable towards one another essentially only in a clamping direction; and
- at least two support elements arranged between the fixing elements, the at least two support elements abutting on one another with polished surfaces, the position of said support elements relative to the fixing elements being adjustable in at least one direction transversely to the clamping direction and being adapted to be fixed between the fixing elements as a result of clamping, the optical components being held on different ones of the elements adjustable relative to one another.

17. Positioning device as defined in claim 16, wherein each support element is provided with a contact element, a connection to an adjusting device being provided via said element.

18. Positioning device as defined in claim 1, wherein the contact element is a receiving means for an adjusting finger of the adjusting device.

19. Positioning device as defined in claim 1, wherein the contact element is accessible via an opening in one of the fixing elements.

20. Positioning device for the exact positioning of a first optical component relative to a second optical component, the positioning device comprising:
- a first fixing element and at least one second fixing element guided relative to one another by a guide means such that they are movable towards one another essentially only in a clamping direction; and
- at least one support element arranged between the fixing elements, the position of said support element relative to the fixing elements being adjustable in at least one direction transversely to the clamping direction and being adapted to be fixed between the fixing elements as a result of clamping, one of the optical components being arranged on one fixing element and the other on at least one support element, said optical components being adjustable relative to one another.

* * * * *

UNITED STATES PATENT AND TRADEMARK OFFICE
CERTIFICATE OF CORRECTION

PATENT NO. : 6,947,227 B2
DATED : September 20, 2005
INVENTOR(S) : Guido Hergenhan It is certified that error appears in the above-identified patent and that said Letters Patent is hereby corrected as shown below:

Column 10,
Line 65, insert a comma after the word "clamping".

Signed and Sealed this

Twenty-second Day of November, 2005

JON W. DUDAS
*Director of the United States Patent and Trademark Office*